(12) United States Patent
Higgins et al.

(10) Patent No.: US 7,711,312 B2
(45) Date of Patent: May 4, 2010

(54) METHOD AND SYSTEM FOR DETECTING OFF-TOPIC ESSAYS WITHOUT TOPIC-SPECIFIC TRAINING

(75) Inventors: Derrick Higgins, Highland Park, NJ (US); Jill Burstein, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 433 days.

(21) Appl. No.: 11/347,060

(22) Filed: Feb. 3, 2006

(65) Prior Publication Data

US 2006/0172276 A1    Aug. 3, 2006

Related U.S. Application Data

(60) Provisional application No. 60/649,660, filed on Feb. 3, 2005.

(51) Int. Cl.
*G09B 11/00* (2006.01)
(52) U.S. Cl. .................................................... 434/353
(58) Field of Classification Search ................ 434/350, 434/353, 362
See application file for complete search history.

(56) References Cited

U.S. PATENT DOCUMENTS

2002/0156632 A1* 10/2002 Haynes et al. ............. 704/270
2004/0175687 A1* 9/2004 Burstein et al. ............ 434/353
2005/0143971 A1* 6/2005 Burstein et al. ............ 704/4

OTHER PUBLICATIONS

Sahami et al., A Bayesian Approach to Filtering Junk E-Mail, Learning for Text Categorization: Papers from the 1988 Workshop, 1998, AAAI Technical Report WS-98-05.
Cohen et al., 2004, Learning to Classify Email into Speech Acts, EMNLP 2004.
Joachims, 2002, Optimizing Search Engines Using Clickthrough Data, Proceedings of the ACM Conference on Knowledge Discovery and Data Mining, pp. 133-142.
McCallum et al., Building Domain-Specific Search Engines with Machine Learning Techniques, AAAI-99 Spring Symposium.
Allan et al., Topic Detection and Tracking Pilot Study: Final Report, Proceedings of the Broadcast News Transcription and Understanding Workshop, Feb. 8-11, 1998, pp. 194-218.
Billsus et al., A Hybrid User Model for News Story Classification, Proceedings of the Seventh International Conference on User Modeling (UM '99), Banff Canada, Jun. 20-24, 1999, pp. 99-108.

(Continued)

*Primary Examiner*—Kathleen Mosser
(74) *Attorney, Agent, or Firm*—Jones Day; W. Joseph Melnik

(57) ABSTRACT

Methods and systems for detecting off-topic essays are described that do not require training using human-scored essays. The methods can detect different types of off-topic essays, such as unexpected topic essays and bad faith essays. Unexpected topic essays are essays that address an incorrect topic. Bad faith essays address no topic. The methods can use content vector analysis to determine the similarity between the essay and one or more prompts. If the essay prompt with which an essay is associated is among the most similar to the essay, the essay is on-topic. Otherwise, the essay is considered to be an unexpected topic essay. Similarly, if the essay is sufficiently dissimilar to all essay prompts, the essay is considered to be a bad faith essay.

18 Claims, 4 Drawing Sheets

OTHER PUBLICATIONS

Hripcsak et al., Unlocking Clinical Data from Narrative Reports: A Study of Natural Language Processing, 1995, Ann. Intern. Med. 122(9):681-688.

Wilcox et al., The Role of Domain Knowledge in Automating Medical Text Report Classification, 2003, Journal of the American Medical Information Association, 10: 330-338.

Page, The Imminence of Grading Essays by Computer, 1966, Phi Delta Kappa 48:238-243.

Burstein et al., Automated Scoring Using a Hybrid Feature Identification Technique, Proceedings of 36th Annual Meeting of the Association of Computational Linguistics, Aug. 10-14, 1998, pp. 206-210.

Foltz et al., The Measurement of Textual Coherence with Latent Semantic Analysis, 1998, Discourse Processes 25(2-3):285-307.

Larkey, Automatic Essay Grading Using Text Categorization Techniques, Proceedings of the 21st ACM-SIGIR Conference on Research and Development in Information Retrieval, Aug. 24-28, 1998, pp. 90-95.

Elliott, IntelliMetric: From Here to Validity, in Automated Essay Scoring: A Cross-Disciplinary Perspective, Shermis et al. eds., Mahwah, NJ, 2003.

Harman, the Darpa Tipster Project, 1992, SIGIR Forum 26(2):26-28.

International Application of PCT Application No. PCT/US2006/004130, Jul. 1, 2008, 2 page.

* cited by examiner

METHOD AND SYSTEM FOR DETECTING OFF-TOPIC ESSAYS WITHOUT TOPIC-SPECIFIC TRAINING

CROSS REFERENCE TO RELATED APPLICATION

This patent application claims priority to, and incorporates by reference in its entirety, U.S. Provisional Patent Application No. 60/649,660, entitled "Method and System for Detecting Off-Topic Essays Without Topic-Specific Training" and filed Feb. 3, 2005.

TECHNICAL FIELD

The present invention relates generally to the field of document classification. The present invention particularly relates to a method and system for detecting off-topic essays without training the detection mechanism as to the topic for each essay.

BACKGROUND

Much work has been performed in the area of text document classification. For example, e-mail sorting has been proposed in Sahami, Dumais, Heckerman & Horvitz, "A Bayesian Approach to Filtering Junk E-Mail," Learning for Text Categorization: Papers from the 1988 Workshop, AAAI Technical Report WS-98-05 (1998) and Cohen, Carvalho & Mitchell, "Learning to Classify Email into 'Speech Acts,'" EMNLP 2004, each of which are incorporated herein by reference in their entireties.

Text-document classification is also performed by Internet-based search engines, such as are described in Joachims, "Optimizing Search Engines Using Clickthrough Data," Proceedings of the ACM Conference on Knowledge Discovery and Data Mining (2002) and McCallum, Nigam, Rennie & Seymore, "Building Domain-Specific Search Engines with Machine Learning Techniques," AAAI-99 Spring Symposium, each of which are incorporated herein by reference in their entireties.

Other work teaches the classification of news articles, such as Allan, Carbonell, Doddington, Yamron & Yang, "Topic Detection and Tracking Pilot Study: Final Report," Proceedings of the Broadcast News Transcription and Understanding Workshop, pp 194-218 (1998) and Billsus & Pazzani, "A Hybrid User Model for News Story Classification," Proceedings of the Seventh International Conference on User Modeling (UM '99), Banff Canada (Jun. 20-24, 1999), each of which are incorporated herein by reference in their entireties.

Moreover, information in medical reports can be classified by text documentation classifiers, such as those taught by Hripcsak, Friedman, Alderson, DuMouchel, Johnson & Clayton, "Unlocking Clinical Data from Narrative Reports: A Study of Natural Language Processing," Ann Intern Med 122(9): 681-88 (1995); and Wilcox & Hripcsak, "The Role of Domain Knowledge in Automating Medical Text Report Classification," Journal of the American Medical Information Association 10:330-38 (2003), each of which are incorporated herein by reference in their entireties.

In addition, research has been performed in the area of automated essay scoring, such as by Page, "The Imminence of Grading Essays by Computer," Phi Delta Kappan 48:238-43 (1966); Burstein et al., "Automated Scoring Using a Hybrid Feature Identification Technique," Proceedings of 36th Annual Meeting of the Association of Computational Linguistics, pp 206-10 (1998); Foltz, Kintsch & Landauer, "The Measurement of Text Coherence Using Latent Semantic Analysis," Discourse Processes 25(2-3): 285-307 (1998); Larkey, "Automatic Essay Grading Using Text Categorization Techniques," Proceedings of the 21st ACM-SIGIR Conference on Research and Development in Information Retrieval, pp 90-95 (1998); and Elliott, "Intellimetric: From Here to Validity," in Shermis & Berstein, eds., "Automated Essay Scoring: A Cross-Disciplinary Perspective" (2003), each of which are incorporated herein by reference in their entireties.

In the area of automated essay evaluation and scoring, systems have been developed that perform one or more natural language processing (NLP) methods. For example, a first NLP method includes a scoring application that extracts linguistic features from an essay and uses a statistical model of how these features are related to overall writing quality in order to assign a ranking or score to the essay. A second NLP method includes an error evaluation application that evaluates errors in grammar, usage and mechanics, identifies an essay's discourse structure, and recognizes undesirable stylistic features.

Additional NLP methods can provide feedback to essay writers regarding whether an essay appears to be off-topic. In this context, an off-topic essay is an essay that pertains to a different subject than other essays in a training corpus, as determined by word usage. Such methods presently require the analysis of a significant number of essays that are written to a particular test question (topic) and have been previously scored by a human reader to be used for training purposes.

One such method for determining if an essay is off-topic requires computing two values determined based on the vocabulary used in an essay. In the method, a "z-score" is calculated for each essay for each of two variables: a) a relationship between the words in the essay response and the words in a set of training essays written in response to the essay question to which the essay responds, and b) a relationship between the words in the essay response and the words in the text of the essay question. A z-score value indicates an essay's relationship to the mean and standard deviation values of a particular variable based on a training corpus of human-scored essay data from which off-topic essays are excluded. A z-score value is computed using the mean value and the corresponding standard deviation for the maximum cosine value or the prompt cosine value based on the human-scored training essays for a particular test question. The formula for computing a z-score for a particular essay is equal to $$\frac{\text{value} - \text{mean}}{\text{std. dev.}}.$$

In order to identify off-topic essays, z-scores are computed for: a) the maximum cosine value, which is the highest cosine value among all cosines between an essay and all human-scored training essays, and b) the essay question cosine value, which is the cosine value between an essay and the text of the essay question. When a z-score exceeds a pre-defined threshold, the essay is likely to be anomalous (i.e., off-topic), since the threshold is typically set to a value representing an acceptable distance from the mean.

The accuracy of such an approach can be determined by examining the false positive rate and the false negative rate. The false positive rate is the percentage of appropriately written, on-topic essays that have been incorrectly identified as off-topic. The false negative rate is the percentage of off-topic essays not identified as off-topic. Typically, it is preferable to have a lower false positive rate so that a student is not incorrectly admonished for writing an off-topic essay.

For a particular essay set, the false positive rate using this method is approximately 5%, and the false negative rate is approximately 37%, when the z-scores of both the maximum cosine and essay question cosine measures exceed the thresholds. For bad faith essays, the average false negative rate is approximately 26%. A false positive rate is meaningless since the essays are not written to any essay topic.

Such a method requiring a training corpus is particularly limiting where users of the method, such as teachers providing essay questions to students, require the ability to spontaneously generate new topics for their students. Another case where a training corpus is limiting occurs in the case where content developers periodically desire to add new topics to a system embodying such methods. In either case, if a significant number of essays are to be scored, it would be preferable to automatically determine whether each essay is directed to the particular topic question.

None of the above methods include a method for automatically evaluating whether an essay is off-topic without utilizing a training corpus of essays on a particular topic.

The present invention is directed to solving one or more of the above-listed problems.

SUMMARY

Before the present methods, systems, and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to an "essay" is a reference to one or more essays and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

The present disclosure relates to a method of detecting off-topic essays. The method may include receiving a plurality of essay prompts, receiving an essay response associated with at least one essay prompt, for each of one or more essay prompts, comparing the essay response to the essay prompt to generate a similarity score, and determining whether the essay response is off-topic based at least in part on one or more similarity scores. Determining if the essay response is off-topic may include determining if the essay response comprises one or more of an unexpected topic essay response and a bad faith essay response. Generating a similarity score may include using content vector analysis. An off-topic essay response may be an unexpected topic essay response if the similarity score has a percentile ranking of below about 10%. An off-topic essay response may be a bad faith essay response if the similarity score is less than a similarity cutoff value. The similarity cutoff value may include a constant value.

In an embodiment, the method may include constructing a vector of features and determining if the essay response is a bad faith off-topic essay response based on the vector of features. In another embodiment, determining from the vector features if the essay response is an off-topic essay response may include using a classifier.

In an embodiment, a processor-readable storage medium may contain one or more programming instructions for performing the method of detecting an off-topic essay response. Determining if the essay response is off-topic may include one or more programming instructions for determining if the essay response includes one or more of an unexpected topic essay response and a bad faith essay response. In an embodiment, determining if the off-topic essay response is a bad faith essay response may include one or more programming instructions for determining if the similarity score has a low cosine correlation value. In another embodiment, determining if the off-topic essay response is an unexpected topic essay response may include one or more programming instructions for determining if the similarity score has a percentile ranking of below about 10%. In a further embodiment, generating a similarity score may include one or more programming instructions for performing a content vector analysis. In an alternate embodiment, the processor-readable storage medium may further include instructions for constructing a vector of features and determining if the essay response is a bad faith off-topic essay response based on the vector of features.

In an embodiment, a system for detecting an off-topic essay response may include a processor and a processor-readable storage medium. The processor-readable storage medium may contain one or more programming instructions for performing a method of detecting an off-topic essay response. In an alternate embodiment, the processor-readable storage medium may further include instructions for constructing a vector of features and determining if the essay response is a bad faith off-topic essay response based on the vector of features.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
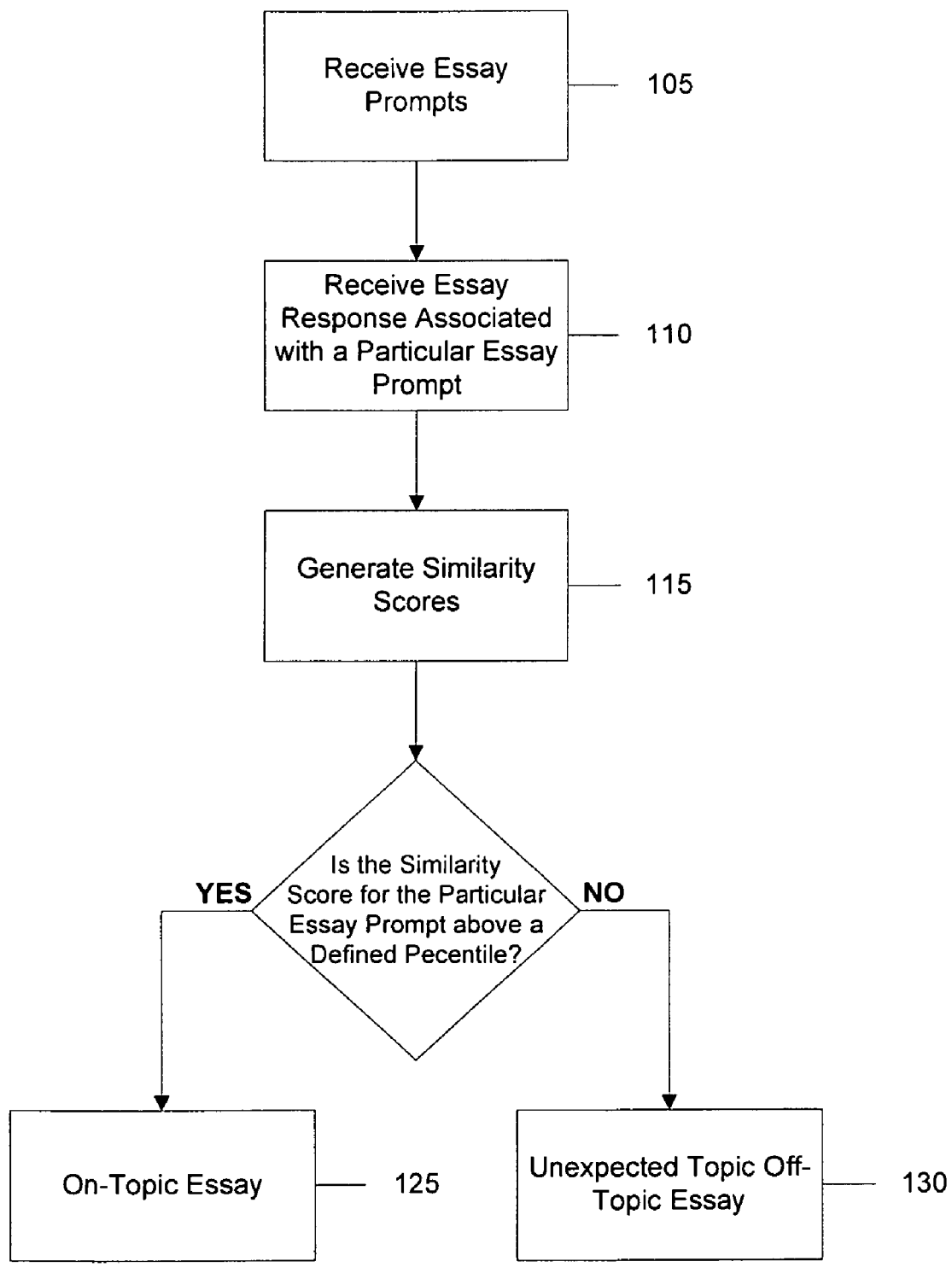
FIG. 1 depicts a flow diagram of an exemplary method of determining whether an essay response is an unexpected topic off-topic essay according to an embodiment.

Two types of off-topic essays may be examined according to the methods described below: unexpected topic essays and bad faith essays. An unexpected topic essay may include, for example, a well-formed, well-written essay on a topic that does not respond to the associated test question. For example, an unexpected topic essay may occur when a student misreads a test question or answers the test question in an improper answer space.

A bad faith essay, on the other hand, may include an essay that deliberately does not respond to a test question. The following is an example of a bad faith essay:

"You are stupid. You are stupid because you can't read. You are also stupid because you don't speak English and because you can't add.

"Your so stupid, you can't even add! Once, a teacher give you a very simple math problem; it was 1+1=?. Now keep in mind that this was in fourth grade, when you should have known the answer. You said it was 23! How much more stupid can you be?!

"So have I proved it? Don't you agree that you're the stupidest person on earth? I mean, you can't read, speak English or add. Let's face it, you're a moron, no, an idiot, no, even worse, you're an imbosol."

In each of these cases, the resulting essay may be well formed in terms of structure, but may not address the topic of the test question. Unexpected topic essays and bad faith essays may be identified using different, but complementary, methods. In an embodiment, the methods for determining unexpected topic essays and bad faith essays may be applied to one or more essays concurrently or consecutively to determine whether each essay falls within one or more of the off-topic essay types.

In an embodiment, a model for off-topic essay detection may use content vector analysis to compute similarity scores between an essay and one or more essay prompts, including a target prompt to which the essay is directed. Each similarity score may be calculated as the cosine of the angle between a content vector for the essay and a content vector for a particular essay prompt. In other words, the cosine of the angle between the content vectors may represent the extent to which they contain the same words in the same proportion.

Unlike the z-score method, the method for determining whether an essay is an unexpected topic essay does not rely on a pre-specified similarity score cutoff. Because this method is independent of a similarity score cutoff, no prompt-specific essay data may be required for training in order to set the value of an on-topic/off-topic parameter.

In an embodiment, no stemming may be performed to preprocess the texts for the content vector analysis process. In an embodiment, a stop list may be used to exclude non-content-bearing words from the calculation. A weight for each word in a text's content vector may be computed by Equation (1):

$$\text{Weight} = (1 + \log(tf)) * \log\left(\frac{D}{df}\right), \quad (1)$$

where:

tf is the term frequency, df is the document frequency, and

D is the total number of documents in the collection.

The term frequency for a word may be equal to the number of times that the word appears in a document (i.e., in the essay or the text of the essay prompt). A document frequency for a word may be equal to the number of times the word appears in a generic corpus, such as the TIPSTER collection (See Harman, "The DARPA TIPSTER Project," SIGIR Forum 26(2), pp 26-28 (1992)). In an embodiment, the generic corpus may have no particular relationship with the essays to be examined.

FIG. 1 depicts a flow diagram of an exemplary method of determining whether an essay response is an unexpected topic off-topic essay according to an embodiment. In order to determine if an essay (the terms "essay" and "essay response" are used interchangeably herein) is an unexpected topic essay, essay responses to a plurality of essay prompts may be considered as a group. For example, if a test requires responses to a plurality of essay prompts, the responses to all essay prompts may be grouped 105 together when determining whether essays are off-topic. Moreover, prompts may be grouped together into a prompt pool. In an embodiment, essay prompts from other sources may be used as part of the evaluation process. Each essay response may be associated 110 with at least one prompt to which the essay provides an answer.

Essays may tend to have a significant amount of vocabulary overlap, even across topics. Essay prompts similarly may have a significant amount of vocabulary overlap. For example, if a first essay prompt poses a question pertaining to "schools" and a second essay prompt poses a question pertaining to "teachers," essays written based on each of the first and second essay prompts may be expected to use similar vocabulary. Moreover, many words, such as "I,", "agree," and "opinion," may tend to appear in essays regardless of topic. Accordingly, selecting a discrete threshold based on any measure to estimate similar vocabulary usage between an essay and an essay prompt may be ineffective. In addition, the similarity of essays to their essay prompts may be highly variable. As such, it is difficult to set an absolute similarity cutoff value to determine if an essay relates to an unexpected topic. However, an essay prompt associated with an essay response may be expected to rank among the most similar (i.e., have one of the largest cosine values) if the essay is on-topic.

Accordingly, each essay response may be compared 115 with each essay prompt to generate a similarity score. In an embodiment, the comparison may compute a cosine correlation value by performing content vector analysis as described above. If the similarity score between the essay and its associated essay prompt has a percentile ranking of above about 10%, the essay may be considered to be an on-topic essay 125. If the essay prompt has a percentile ranking of below about 10%, the essay may be considered to be an unexpected topic off-topic essay 130.

In an embodiment, the method of determining whether an essay is a bad faith essay may use a generic similarity cutoff value. Since bad faith essays may not tend to share vocabulary with any essay prompt, a bad faith essay may not generally correspond to any essay prompt.

Figure 2:
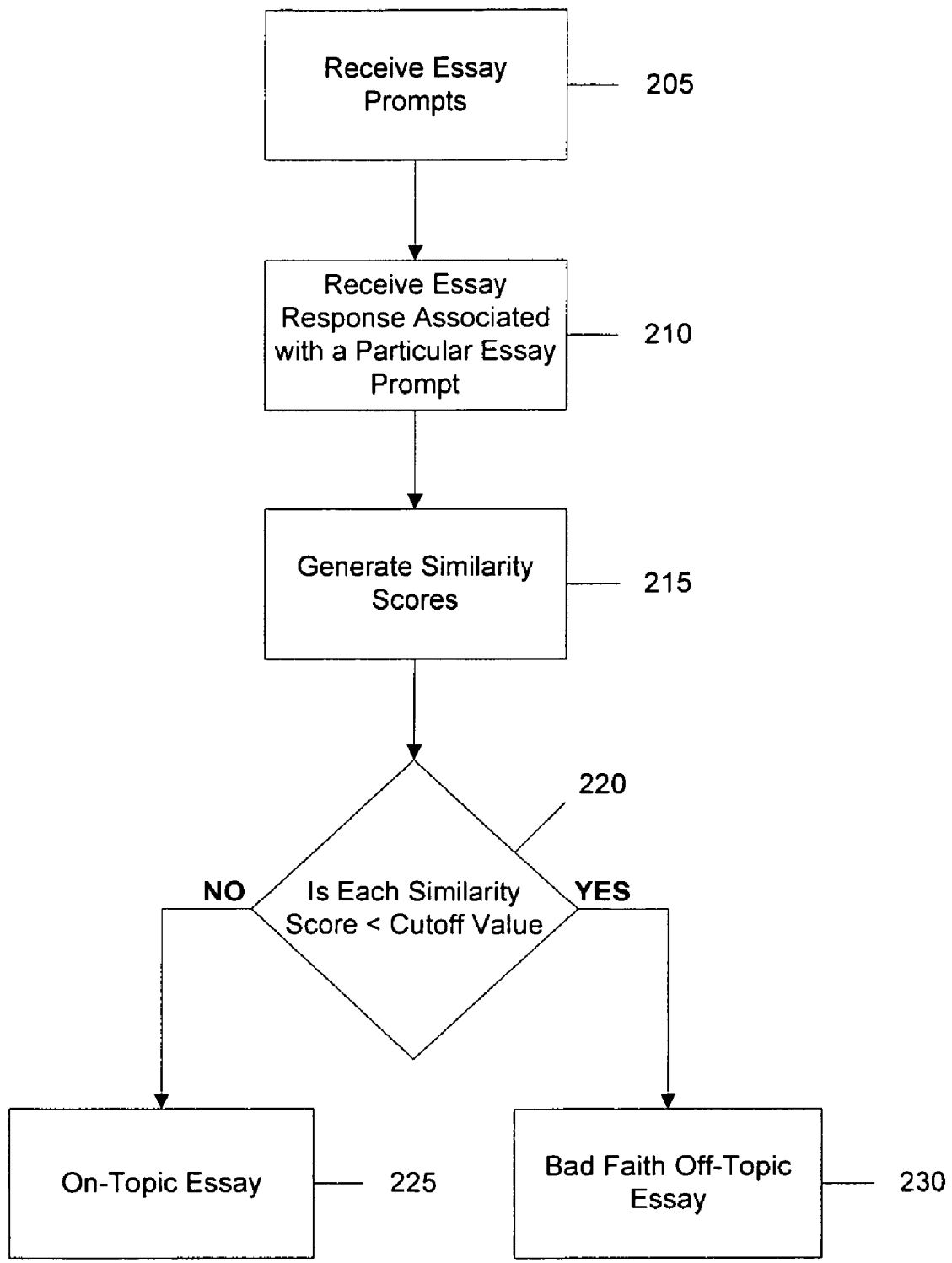
FIG. 2 depicts a flow diagram of an exemplary method of determining whether an essay response is a bad faith off-topic essay according to an embodiment.

FIG. 2 depicts a flow diagram of an exemplary method of determining whether an essay response is a bad faith off-topic essay according to an embodiment. To determine if an essay response contains a bad faith essay, a plurality of essay prompts may first be received 205. An essay response associated with a particular essay prompt may also be received 210. The essay response may be compared 215 with each essay prompt to generate a similarity score. In an embodiment, the comparison may compute a cosine correlation value by performing content vector analysis as described above in reference to the unexpected topic essay analysis. An essay response for which all computed essay prompt cosine correlation values are less than the generic similarity cutoff value 220 may be considered a bad faith off-topic essay 225. Otherwise, the essay response may be considered to be on-topic 230.

Although the generic similarity cutoff value may be determined based on past data, the value of the generic similarity cutoff value may not be adjusted for a new essay prompt. In other words, no training based on essay responses may be required to determine a generic similarity cutoff value for a new essay prompt. Instead, the generic similarity cutoff value may be a constant value across all essay prompts, including essay prompts that were not initially used to determine the generic similarity cutoff value.

Figure 3:
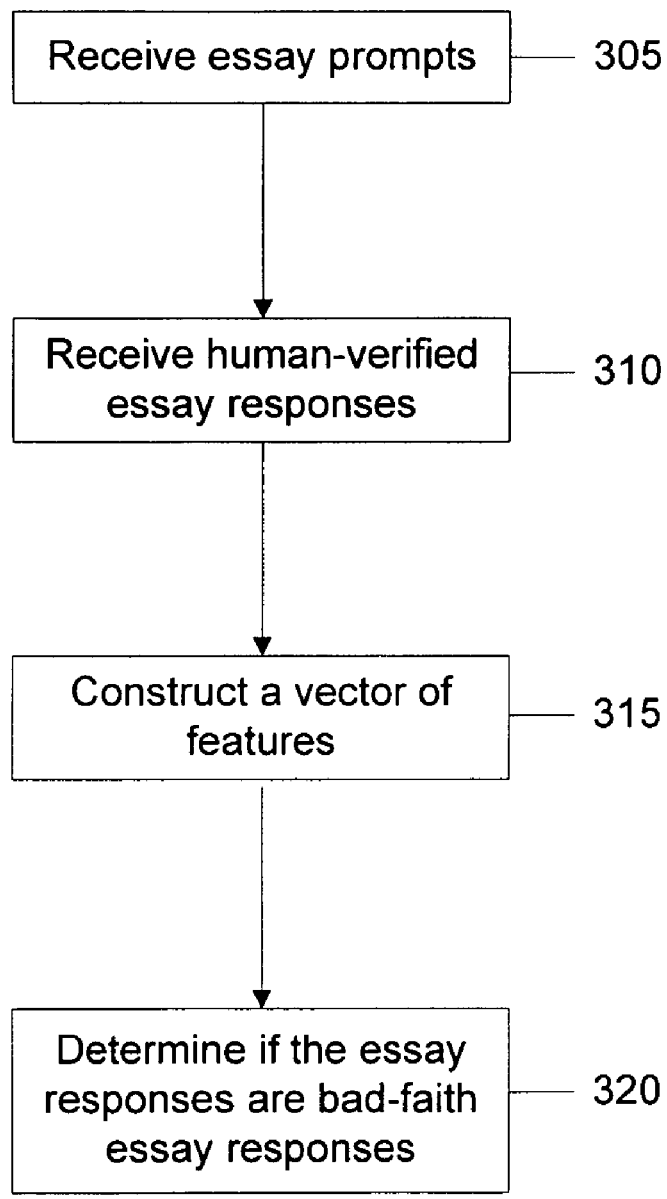
FIG. 3 depicts a flow diagram of an alternate method of determining whether an essay response is a bad faith off-topic essay according to an embodiment.

In an alternate embodiment, as shown in FIG. 3, a bad faith-essay may be determined by receiving a plurality of essay prompts 305, receiving human-verified bad faith and on-topic essays 310, and constructing a vector of features from human-verified bad faith and on-topic essays by comparing the essays to the prompt to which each essay was supposed to have been written 315. The vector of features derived from the human-verified bad faith essays may emulate a bad faith essay. In contrast, the vector of features derived from the human-verified on-topic essays may not emulate a bad faith essay.

In an embodiment, the feature of an essay that may be used to predict whether an essay response is on-topic may include a similarity between a content vector for the essay response and a content vector for the essay prompt. However, several features of an essay response may be used to predict whether the essay was written in bad faith. These features may additionally include, for example, the number of words in the essay response, the proportion of words that are found in the essay response and not in the essay prompt, the ratio of word types to the number of words in the essay response, and the frequency with which markers of direct address occur in the essay response. Markers of direct address may include, for example, statements directed to a person, such as a test author or teacher, as compared to expository writing which one would expect to find in an essay response. Exemplary markers, which suggest that the essay writer may be writing to someone, may include the name of the test (e.g., "GMAT"), the word "hello" and/or the word "thanks."

After the content vectors have been constructed, the content vector features may be used to train a classifier, such as a support vector machine, neural network, decision tree, or any other classifiers known by those of ordinary skill in the art. Once trained, the classifier may determine and/or assist in determining whether an essay is a bad faith essay 320 based on the vector of features.

In an embodiment, each of the unexpected topic essay and bad faith essay algorithms may be performed concurrently or consecutively. If an essay response is determined to be an unexpected topic off-topic essay, such as in 130, or a bad faith off-topic essay, such as in 225 and 320, the fact that the other algorithm may designate the essay response as an on-topic essay may be of no consequence. In other words, if either off-topic classification is assigned to an essay response, the essay response may be determined to be off-topic.

Figure 4:
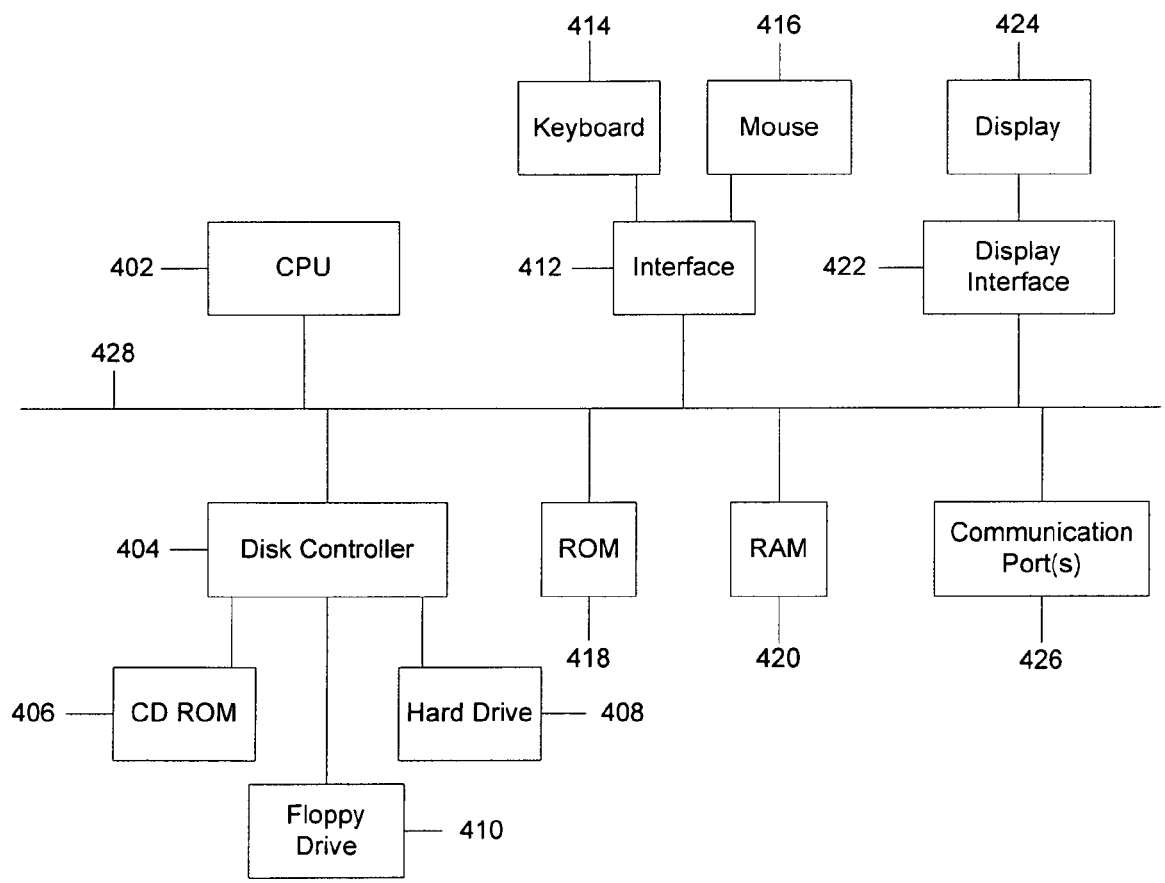
FIG. 4 depicts a block diagram of exemplary hardware that contains or implements program instructions according to an embodiment.

FIG. 4 is a block diagram of exemplary internal hardware that may be used to contain or implement the program instructions according to an embodiment. Referring to FIG. 4, a bus 428 may serve as a main information highway interconnecting the other illustrated components of the hardware. CPU 402 is the central processing unit of the system, performing calculations and logic operations required to execute a program. Read only memory (ROM) 418 and random access memory (RAM) 420 constitute exemplary memory devices.

A disk controller 404 interfaces with one or more optional disk drives to the system bus 428. These disk drives may be external or internal floppy disk drives such as 410, CD ROM drives 406, or external or internal hard drives 408. As indicated previously, these various disk drives and disk controllers are optional devices.

Program instructions may be stored in the ROM 418 and/or the RAM 420. Optionally, program instructions may be stored on a processor-readable medium or carrier such as a floppy disk or a digital disk or other recording medium, a communications signal or a carrier wave.

An optional display interface 422 may permit information from the bus 428 to be displayed on the display 424 in audio, graphic or alphanumeric format. Communication with external devices may optionally occur using various communication ports 426. An exemplary communication port 426 may be attached to a communications network, such as the Internet or an intranet.

In addition to computer-type components and their equivalents, the hardware may also include an interface 412 that allows for receipt of data from input devices such as a keyboard 414 or other input device 416 such as a remote control, pointer and/or joystick.

A multiprocessor system may optionally be used to perform one, some or all of the operations described herein. Likewise, an embedded system may optionally be used to perform one, some or all of the operations described herein.

It is to be understood that the invention is not limited in its application to the details of construction and to the arrangements of the components or steps set forth in this description or illustrated in the drawings. The disclosed method and system are capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the disclosed embodiments.

We claim:

1. A computer-implemented method of detecting a bad faith essay response, the method comprising:
   receiving a plurality of essay prompts with a computer;
   receiving an essay response in the computer associated with a particular essay prompt of the plurality of essay prompts;
   scoring by the computer the essay response associated with the particular essay prompt against each of the plurality of essay prompts to generate plural similarity scores; and
   determining by the computer if the essay response associated with the particular essay prompt is a bad faith essay response based at least in part on determining whether the plural similarity scores indicate that the essay response associated with the particular essay prompt is sufficiently dissimilar to each of the plurality of essay prompts.

2. The method of claim 1 wherein determining if the essay response is a bad faith essay response further comprises using a classifier including a neural network, the classifier being trained by vectors of features and then at least assisting in determining whether the essay response is a bad faith essay response based on the vectors of features.

3. The method of claim 1 wherein the essay response is a bad faith essay response if at least one of these outcomes is true:
the essay response and a human-verified bad faith essay are sufficiently similar, and
markers of direct address occur in the essay response at a predetermined frequency.

4. The method of claim 1 wherein generating a similarity score further comprises evaluating the proportion of words that are found in the essay response and not in the essay prompt.

5. The method of claim 1, wherein determining if the essay response associated with the particular essay prompt is a bad faith essay response is carried out without utilizing training essays on a topic for the particular essay prompt.

6. The method of claim 1, wherein the determining whether the plural similarity scores indicate that the essay response associated with the particular essay prompt is sufficiently dissimilar to each of the plurality of essay prompts comprises determining whether the plural similarity scores are below a cutoff value.

7. A processor-readable storage medium containing one or more programming instructions for detecting a bad faith essay response, the programming instructions, when executed, causing a processing system to execute steps comprising:
receiving a plurality of essay prompts;
receiving an essay response associated with a particular essay prompt of the plurality of essay prompts;
scoring the essay response associated with the particular essay prompt against each of the plurality of essay prompts to generate plural similarity scores; and
determining if the essay response associated with the particular essay prompt is a bad faith essay response based at least in part on determining whether the plural similarity scores indicate the essay response associated with the particular essay prompt is sufficiently dissimilar to each of the plurality of essay prompts.

8. The processor-readable storage medium of claim 7 wherein determining from the vector of features if the essay response is a bad faith essay response further comprises using a classifier including a neural network, the classifier being trained by vectors of features and then at least assisting in determining whether the essay response is a bad faith essay response based on the vectors of features.

9. The processor-readable storage medium of claim 7 wherein determining if the essay response is a bad faith essay response comprises determining if at least one of these outcomes is true:
the essay response and a human-verified bad faith essay are sufficiently similar, and
markers of direct address occur in the essay response at a predetermined frequency.

10. The processor-readable storage medium of claim 7 wherein generating a similarity score further comprises one or more programming instructions for evaluating the proportion of words that are found in the essay response and not in the essay prompt.

11. The processor-readable storage medium of claim 7, wherein determining if the essay response associated with the particular essay prompt is a bad faith essay response is carried out without utilizing training essays on a topic for the particular essay prompt.

12. The processor-readable storage medium of claim 7, wherein the determining whether the plural similarity scores indicate that the essay response associated with the particular essay prompt is sufficiently dissimilar to each of the plurality of essay prompts comprises determining whether the plural similarity scores are below a cutoff value.

13. A system for detecting a bad faith essay response, the system comprising:
a processor; and
a processor-readable storage medium,
wherein the processor-readable storage medium contains one or more programming instructions for detecting a bad faith essay response by causing the processor to execute steps comprising:
receiving a plurality of essay prompts,
receiving an essay response associated with a particular essay prompt of the plurality of essay prompts,
scoring the essay response associated with the particular essay response against each of the plurality of essay prompts to generate plural similarity scores, and
determining if the essay response associated with the particular essay prompt is a bad faith essay response based at least in part on determining whether the plural similarity scores indicate the essay response associated with the particular essay prompt is sufficiently dissimilar to each of the plurality of essay prompts.

14. The system of claim 13 wherein determining if the essay response is a bad faith essay response further comprises using a classifier including a neural network, the classifier being trained by vectors of features and then at least assisting in determining whether the essay response is a bad faith essay response based on the vectors of features.

15. The system of claim 13 wherein the essay response is a bad faith essay response if the processor determines that at least one of these outcomes is true:
the essay response and a human-verified bad faith essay are sufficiently similar, and
markers of direct address occur in the essay response at a predetermined frequency.

16. The system of claim 13 wherein generating a similarity score further comprises evaluating the proportion of words that are found in the essay response and not in the essay prompt.

17. The system of claim 13, wherein determining if the essay response associated with the particular essay prompt is a bad faith essay response is carried out without utilizing training essays on a topic for the particular essay prompt.

18. The system of claim 13, wherein the determining whether the plural similarity scores indicate that the essay response associated with the particular essay prompt is sufficiently dissimilar to each of the plurality of essay prompts comprises determining whether the plural similarity scores are below a cutoff value.

* * * * *